3,418,300
INHIBITION OF POLYMERIZATION
Akira Nakajima, Kenji Takeya, and Masanobu Hoten, Saidaiji, Japan, assignors to American Cyanamid Company, Stamford, Conn., a corporation of Maine
No Drawing. Filed Dec. 16, 1964, Ser. No. 418,908
Claims priority, application Japan, Jan. 16, 1964, 39/1,912; Apr. 23, 1964, 39/23,289
6 Claims. (Cl. 260—85.5)

ABSTRACT OF THE DISCLOSURE

A process for inhibiting polymerization of aqueous solutions of monomers containing ethylenically unsaturated groups which are polymerizable when in the presence of a polymerization initiator system containing a reducing sulfoxy compound as one of its components comprising adding to such solutions, in an amount sufficient to inhibit polymerization, a compound selected from the group consisting of water-soluble nitrites and nitric oxide.

---

This invention relates to a process of polymerizing polymerizable monomers containing ethylenically unsaturated groups in the presence of a polymerization initiator containing a reducing sulfoxy compound as one of its activating ingredients. More particularly, this invention relates to a process for substantially stopping further polymerization of such monomers by adding to a slurry containing unreacted monomers, unreacted initiator and polymer already formed, a water-soluble nitrite or nitric oxide.

In the polymerization of polymerizable monomers containing ethylenically unsaturated groups in an aqueous medium, it is necessary to separate the polymer from the unreacted monomers and the unreacted polymerization initiator. A presently preferred method is to distill off the unreacted monomers from the aqueous slurry containing the polymer. However, subjecting the slurry to distillation causes several difficulties. The polymer already produced is liable to be stained or discolored. Unreacted monomer tends to undergo a secondary polymerization reaction in the presence of the unreacted initiator still present in the slurry forming a polymer which is different from the polymer desired and which adversely affects the quality of the final product. Also, secondary reactions occur tending to increase the molecular weight of the polymer previously produced as well as causing branching or the growth of side chains. Also, distillation to recover the monomers, whether performed on the slurry or on the filtrate after filtering out the polymer, suffers from the troubles induced at further polymerization of the unreacted monomers throughout the distillation apparatus causing clogging thereof and reducing the efficiency of monomer recovery.

It is an object of this invention to provide a technique for eliminating the above-mentioned disadvantages. We have found that this can be accomplished by inhibiting further polymerization by adding a water-soluble nitrite or nitric oxide to the aqueous slurry produced from such polymerizations.

Thus, the present invention serves two purposes, that of preventing degradation of the polymer already formed and of inhibiting further polymerization of the unreacted monomers in the recovery process. In part, it accomplishes these results by inactivating the reducing sulfoxy compound of the unreacted polymerization initiator.

The reducing sulfoxy compound that is employed in the polymerization systems with which the present invention is concerned may be such compounds as sulfur dioxide, sulfites, bisulfites, metabisulfites, hydrosulfites, thiosulfites, dialkyl sulfite, p-toluenesulfinic acid, formamidinesulfinic acid, and the like. Examples of polymerization initiators containing such reducing sulfoxy compounds are the peroxy compound-sulfoxy compound system described in Japanese patent publication No. 4,942/1954 and No. 4,235/1960, the chloric acid-sulfurous acid system described in Japanese publication No. 2,594/1952 and No. 3,841/1953, and the azo compound-sulfoxy compound system described in Japanese patent publication No. 889/1961.

Frequently, in the use of such polymerization initiators an excess of the sulfoxy compound is used as compared with the equivalents required to reduce the oxidizer component. In such cases, such excess of the reducing sulfoxy compound remains in the polymeric slurry and may find its way into the recovered monomer in the form of sulfur dioxide when the monomers are distilled in the recovery process. For this reason, the recovered monomeric mixture is acidic and tends to undergo further polymerization, hydrolysis and other objectionable secondary reactions. However, when, in accordance with this invention, a water-soluble nitrite or nitric oxide is added to the polymer slurry, the above-mentioned troubles in the recovery process are eliminated and the recovery of unreacted monomers is greatly facilitated for the slurry is prevented from undergoing further polymerization and the sulfoxy compound remaining unreacted therein is now inactivated.

As used herein, the term "polymerizable monomers" means acrylonitrile and methacrylonitrile, as well as their substitution products, styrene, chlorostyrene, p-methoxystyrene, alpha-methylstyrene, vinyl naphthalene and other arylolefines, acrylic acids, methacrylic acids and their substitution products, such as acrylic acid, methacrylic acid, methyl acrylate, ethyl acrylate, isobutyl acrylate, methyl alpha-chloroacrylate, methyl methacrylate, ethyl methacrylate, butyl methacrylate, ethyl ethacrylate, isoamyl ethacrylate, acrylamide, methacrylamide, etc., esters, amides, methylisopropenylketone, methylvinyl ether, vinylethyl carbinol, vinylidene chloride, vinyl pyridines such as 2-vinyl pyridine, 4-vinyl pyridine, 2-methyl-5-vinyl pyridine, etc., vinyl carboxylates such as vinyl acetate, vinyl formate, vinyl benzoate, etc., vinyl chloride, vinyl carbazol, maleic acid, fumalic acid, and itaconic acid as well as their esters, allylsulfonic acid, methallylsulfonic acid, and styrenesulfonic acid, as well as their water-soluble salts.

This invention finds its application not only in ordinary co-polymerization but also in graft and block co-polymerization reactions. Furthermore, the invention is applicable to polymerization reactions to be conducted in aqueous media without using emulsifiers, and also, to emulsion polymerization reactions which are conducted in the presence of emulsifiers or suspension stabilizers.

This invention will be further described in detail in the following examples, in which all parts are by weight.

EXAMPLE 1

A reaction vessel provided with agitator means was charged with 1400 parts of deionized water, 90 parts of acrylonitrile, and 10 parts of methyl acrylate, so that the monomers were thoroughly mixed and dissolved in the water. With the internal temperature of the reaction vessel held at a constant level of 45° C., the air trapped in the vessel was replaced with nitrogen gas, followed by the addition of 3.0 parts of potassium persulfate, 1.4 parts of sodium sulfite and 0.7 part of nitric acid. The monomers were polymerized in this manner, with constant stirring. As the polymerization reaction started, the reaction mixture began to show a white turbidity. After 10 minutes, sodium nitrite was added to the slurry and the inhibitory effect of the nitrite on the polymerization reaction was studied. As a control, a similar polymerization reaction was conducted without using sodium nitrite. Thus, after ten minutes of polymerization, the inhibitory effects of each of the following four different treatments in different runs were investigated and the results were compared with one another.

(1) After 10 minutes of polymerization, an aqueous solution of 0.77 part of sodium nitrite in 40 parts of deionized water was introduced into the reaction vessel.

(2) After 10 minutes of polymerization, an aqueous solution of 0.77 part of sodium nitrite in 40 parts of deionized water was introduced into the reaction vessel, along with nitric acid in sufficient amounts to maintain the polymeric slurry at pH 3.0 so that the pH of the slurry was prevented from rising due to the addition of sodium nitrite.

(3) After 10 minutes of polymerization, 40 parts of deionized water was added to the reaction system.

(4) The polymerization reaction was allowed to continue, with nothing added at the 10 minutes point.

After each of the above four treatments, the respective slurries were held at 45° C., with constant stirring until a total of 120 minutes had elapsed after they had begun to show white turbidity. In each case, samples of the slurry were withdrawn from the reaction vessel at suitable intervals, and the degrees of polymerization (the proportion of conversion from monomer to polymer) and the average molecular weights of the polymer (as calculated by means of Staudinger's equation), were measured. Tables 1, 2, 3 and 4 show such results for the respective treatments. It will be apparent from these results that whenever sodium nitrite was added, the polymerization reaction was almost completely inhibited, irrespective of the pH of the slurry, so that the polymer showed no further change in molecular weight.

TABLE 1—TREATMENT (1).—ADDITION OF AN AQUEOUS SOLUTION OF SODIUM NITRITE

| Polymerization time (min.) | Degree of Polymerization (Percent) | Average molecular weight | pH of slurry |
|---|---|---|---|
| 2 | 27.4 | 64,300 | 4.1 |
| 5 | 40.8 | 90,000 | |
| 10 | 67.3 | 78,300 | 4.1 |
| 11 | | | 7.3 |
| 20 | 67.9 | 78,800 | |
| 65 | 68.9 | 78,400 | 7.3 |
| 120 | 69.9 | 78,300 | 6.8 |

TABLE 2—TREATMENT (2).—ADDITION OF AN AQUEOUS SOLUTION OF SODIUM NITRITE AND NITRIC ACID

| Polymerization time (min.) | Degree of Polymerization (Percent) | Average molecular weight | pH of slurry |
|---|---|---|---|
| 2 | 17.7 | | 4.1 |
| 5 | 41.2 | 88,000 | |
| 10 | 62.6 | 79,000 | 4.1 |
| 11 | | | 3.0 |
| 20 | 61.2 | 81,400 | |
| 60 | 63.7 | 82,500 | 3.1 |
| 120 | 63.4 | 82,200 | 3.0 |

TABLE 3—TREATMENT (3).—ADDITION OF WATER

| Polymerization time (min.) | Degree of Polymerization (Percent) | Average molecular weight | pH of slurry |
|---|---|---|---|
| 2 | 12.3 | 94,100 | 3.9 |
| 5 | 54.3 | 73,700 | |
| 10 | 64.8 | 83,800 | 4.0 |
| 20 | 78.6 | 79,300 | |
| 60 | 90.5 | 68,800 | 3.0 |
| 120 | 95.7 | 66,500 | 2.7 |

TABLE 4—TREATMENT (4).—NO ADDITION

| Polymerization time (min.) | Degree of Polymerization (Percent) | Average molecular weight | pH of slurry |
|---|---|---|---|
| (*) | 23.2 | 76,200 | 4.1 |
| 5 | 37.7 | 84,100 | |
| 10 | 55.8 | 82,200 | 3.9 |
| 20 | 78.8 | 70,500 | 3.5 |
| 62 | 89.1 | 64,800 | 3.0 |
| 120 | 88.1 | 62,600 | 2.7 |

* 2 minutes and 40 seconds.

EXAMPLE 2

A reaction vessel equipped with agitator means was charged with 1400 parts of deionized water, 90 parts of acrylonitrile and 10 parts of methyl acrylate so that the monomers were dissolved in the water. With the internal temperature of the reaction vessel held at a constant temperature of 45° C., the air trapped in the vessel was replaced with nitrogen gas, followed by the addition of 3.0 parts of potassium persulfate, 14.0 parts of sodium sulfite (molar ratio: $K_2S_2O_8/Na_2SO_3=1/10$) and 7.0 parts of nitric acid. The polymerization reaction was conducted in this manner, with constant stirring. As the reaction was initiated, the mixture began to show a white turbidity. Ten minutes after this white turbidity began, sodium nitrite was introduced into the reaction system and its inhibitory effect on the reaction was studied. As a control, a similar polymerization reaction was carried out, with no addition of sodium nitrite. Thus, after 10 minutes of polymerization, the sample slurries were treated in the following three different ways and the results were compared with one another.

(1) After 10 minutes of polymerization, an aqueous solution of 7.7 parts of sodium nitrite in 40 parts of deionized water was introduced into the reaction vessel, along with nitric acid in sufficient amounts to maintain the slurry at pH 2.5 so that the pH of the slurry was prevented from rising due to the addition of sodium nitrite.

(2) After 10 minutes of polymerization, 40 parts of deionized water was added.

(3) The polymerization reaction was allowed to continue, with nothing added after said 10 minutes.

The polymer slurries treated in the respective ways as above were held at 45° C., with stirring until a total of 120 minutes (polymerization time) elapsed after said white turbidity appeared.

In each case, samples of the slurry were withdrawn from the reaction vessel at suitable intervals, and the degrees of polymerization and the average molecular weights of the polymer were measured. The results of the above different treatments are summarized in Tables 5, 6 and 7. It will be apparent from these results that addition of sodium nitrite completely inhibits the polymerization reaction so that the polymer suffers no change in molecular weight.

TABLE 5—TREATMENT (1).—ADDITION OF AN AQUEOUS SOLUTION OF SODIUM NITRITE AND NITRIC ACID

| Polymerization time (min.) | Degree of Polymerization (Percent) | Average molecular weight | pH of slurry |
|---|---|---|---|
| 2 | 5.3 | | 4.3 |
| 5 | 9.5 | 64,500 | |
| 10 | 26.9 | 58,500 | 3.8 |
| 11 | | | 2.5 |
| 20 | 26.8 | 61,200 | 2.5 |
| 60 | 26.6 | 63,600 | 2.2 |
| 120 | 26.6 | 61,900 | 2.3 |

TABLE 6—TREATMENT (2).—ADDITION OF WATER

| Polymerization time (min.) | Degree of Polymerization (Percent) | Average molecular weight | pH of slurry |
|---|---|---|---|
| 2 | 5.0 | | 4.1 |
| 6 | 14.4 | 57,900 | 3.8 |
| 10 | 26.3 | 55,100 | |
| 20 | 46.5 | 48,400 | 3.5 |
| 60 | 79.7 | 40,400 | 3.1 |
| 120 | 89.0 | 39,400 | 3.0 |

TABLE 7—TREATMENT (3).—NO ADDITION

| Polymerization time (min.) | Degree of Polymerization (Percent) | Average molecular weight | pH of slurry |
|---|---|---|---|
| 2 | 6.8 | | 4.4 |
| 5 | 15.3 | | 4.0 |
| 12 | 18.1 | 50,700 | 3.9 |
| 20 | 50.4 | 46,000 | |
| 65 | 76.0 | 40,000 | 3.3 |
| 120 | 86.6 | 38,800 | 3.1 |

EXAMPLE 3

A glass reaction vessel equipped with agitator means was charged with 1710 parts of deionized water and 90 parts of methyl acrylate so that the latter was dissolved in the former. With the internal temperature of the vessel held at a predetermined level, the air trapped in the vessel was replaced with nitrogen gas, followed by the addition of 0.063 part of sodium chlorate, 0.597 part of sodium sulfite (molar ratio: $NaClO_3/Na_2SO_3=1/8$) and 0.334 part of nitric acid. The polymerization reaction was initiated in this manner, with constant stirring. The results obtained at 30° C. and 40° C. are shown in Tables 8 and 9, respectively. Referring to Table 8, after 23 minutes of polymerization, 421 and 352 parts of the slurry were withdrawn from the vessel, and 0.092 part of sodium nitrite and 0.26 part of nitric acid were added to the 421 parts of slurry and 0.036 part of sodium nitrite and 0.01 part of nitric acid were added to the 352 parts of the slurry, respectively. The inhibitory effects of such additions were studied and compared with the remainder of the slurry which received no additions. In both Tables 8 and 9, it is apparent that addition of sodium nitrite completely inhibits the polymerization reaction, with no further increase observed in the degree of polymerization.

TABLE 8

[Polymerization temperature: 30° C.]

| Polymerization time (min.) | Degree (percent) of polymerization before addition of inhibitor | Degree (percent) of polymerization after addition of $NaNO_2$ | |
|---|---|---|---|
| | | 0.092 part of $NaNO_2$/421 parts of slurry | 0.036 part of $NaNO_2$/352 parts of slurry |
| 2 | 0.9 | | |
| 5 | 2.3 | | |
| 10 | 7.0 | | |
| 23 | 14.8 | (*) | (*) |
| 30 | 19.1 | 14.7 | 14.9 |
| 60 | 21.0 | 14.7 | |
| 120 | 30.0 | 16.2 | |

*Addition of $NaNO_2$ after 23 min.

TABLE 9

[Polymerization temperature: 45° C.]

| Polymerization time (min.) | Degree (percent) of polymerization before addition of inhibitor | Degree (percent) of polymerization after addition of $NaNO_2$ | |
|---|---|---|---|
| | | 0.092 part of $NaNO_2$/373 parts of slurry | 0.036 part of $NaNO_2$/358 parts of slurry |
| 3 | 3.9 | | |
| 5 | 8.9 | | |
| 10 | 26.4 | (*) | (*) |
| 22 | 49.0 | | 26.3 |
| 120 | 58.3 | 26.0 | |

*Addition of $NaNO_2$ after 10 min.

While the water-soluble nitrite illustrated in the foregoing examples was sodium nitrite, it is readily apparent that other water-soluble nitrites, such as potassium nitrite and ammonium nitrite, may also be utilized in the same manner to substantially stop further polymerization of monomers present.

EXAMPLE 4

To a reaction vessel furnished with an agitator were fed 1400 grams of deionized water, 90 grams of acrylonitrile, and 10 grams of methyl acrylate, and the monomer were mixed and dissolved. With the internal temperature of the vessel held at 45° C., the atmosphere within the vessel was replaced with nitrogen gas, followed by the addition of 0.125 gram of sodium chlorate, 2.37 grams of sodium sulfite ($NaClO_3/Na_2SO_3=1/16$: molar ratio) and 1.33 grams of nitric acid, whereupon the monomers began to polymerize. At this moment, the reaction mixture showed a white turbidity, and after a lapse of ten minutes, nitric oxide was introduced into the reaction vessel through a flowmeter.

(1) Experiment A.—Nitric oxide gas was introduced into the upper atmosphere above the polymer slurry in the vessel with constant agitation and its inhibitory effect on the polymerization reaction was investigated.

(2) Experiment B.—Nitric oxide gas was blown into the polymer slurry in the reaction vessel and its inhibitory effect on the polymerization reaction was investigated. (Flow rate of nitric oxide gas: 310 cc./min. for 5 minutes.)

In both cases, after the addition of nitric oxide, gaseous nitrogen was again introduced with constant stirring at 45° C. The final results are summarized in Tables 10 and 11. Table 12 shows the result of Experiment C, in which, as a control, no nitric oxide was added and the polymerization reaction was allowed to continue for 120 minutes under nitrogen gas.

TABLE 10.—EXPERIMENT A

| Polymerization time (min.) | Degree of Polymerization (Percent) | Average molecular weight | pH of Slurry | Remarks |
|---|---|---|---|---|
| 2 | 5.9 | | 3.1 | |
| 5 | 7.5 | 80,300 | 3.2 | |
| 10 | 27.3 | 80,300 | | Nitric oxide added. |
| 22 | 27.5 | 79,000 | 2.8 | |
| 60 | 27.7 | 79,300 | 2.6 | |

TABLE 11.—EXPERIMENT B

| Polymerization time (min.) | Degree of Polymerization (Percent) | Average molecular weight | pH of Slurry | Remarks |
|---|---|---|---|---|
| 2 | 5.0 | | 3.2 | |
| 5 | 14.4 | 80,300 | | |
| 10 | 30.0 | 80,900 | 3.2 | Nitric oxide added. |
| 20 | 30.1 | 80,300 | 2.8 | |
| 60 | 34.8 | 80,100 | 2.6 | |

TABLE 12.—EXPERIMENT C

| Polymerization time (min.) | Degree of Polymerization (Percent) | Average molecular weight | pH of Slurry |
|---|---|---|---|
| 6 | 18.0 | 83,200 | 3.1 |
| 10 | 29.7 | 82,000 | |
| 20 | 46.3 | 79,500 | 3.0 |
| 60 | 58.2 | 78,100 | 3.0 |
| 120 | 60.8 | 78,000 | 3.2 |

It will be apparent from the above tables that the polymerization reaction is almost completely inhibited by the addition of nitric oxide, thus illustrating the great potential of nitric oxide in polymerization inhibition.

For a further comparison, Table 13 shows the results of an experiment which was conducted in the same manner as Experiment B, except that nitrogen suboxide was used in place of nitric oxide. It was found that no inhibitory effect can be expected of nitrogen suboxide.

TABLE 13.—EXPERIMENT D

[With nitrogen suboxide]

| Polymerization time (min.) | Degree of Polymerization (Percent) | Average molecular weight | pH of Slurry | Remarks |
|---|---|---|---|---|
| 2 | 4.0 | | 3.2 | |
| 5 | 14.5 | 80,800 | 3.2 | |
| 10 | 29.2 | 82,500 | 3.1 | Addition of nitrogen suboxide. |
| 20 | 44.5 | 78,900 | 3.0 | |
| 60 | 60.0 | 76,600 | 3.2 | |
| 120 | 61.7 | 76,900 | | |

EXAMPLE 5

Into the polymer slurry prepared as Example 4 was introduced steam under reduced pressure and the unreacted monomers were recovered. The reaction had been inhibited by adding nitric oxide to the slurry. It was found that when nitric oxide was thus added to the polymer slurry, the polymer was prevented from degradation and that the recovered monomers did not polymerize in the recovery equipment and storage tank, so that the recovery operation could be advantageously carried out.

The monomer recovered as above separated out, upon standing, into a monomeric layer in which water was dissolved and an aqueous layer in which part of the monomer was dissolved. On the other hand, the monomer recovered from the polymer slurry in Experiment C, above, which had not been inhibited with nitricoxide underwent spontaneous polymerization while kept in storage at 5° C. for 7 days, showing a white turbidity. There were no signs of spontaneous polymerization with respect to the monomers recovered from the polymer slurries of Experiments A and B, above, which were inhibited with nitric oxide. To confirm our observation that the monomers recovered as above had not been degraded and contained no materials that would adversely affect the polymerization reaction, we polymerized the recovered monomers in sealed glass tubes. A similar polymerization experiment was conducted with fresh monomer of the same type under comparable conditions. The results are summarized in Table 14. It will be apparent that the two experiments yielded roughly the same results with no signs of the recovered monomer being different from the fresh monomer being observed.

TABLE 14

| Polymerization time (min.) | Recovered monomer (from Experiment A) | | Fresh monomer | |
|---|---|---|---|---|
| | Degree of polymerization (percent) | Average molecular weight | Degree of polymerization (percent) | Average molecular weight |
| 5 | 26.2 | 69,000 | 24.8 | 62,000 |
| 20 | 56.7 | 76,300 | 60.2 | 78,300 |
| 60 | 75.6 | 82,000 | 75.7 | 82,300 |

EXAMPLE 6

A glass reactor equipped with agitator means was charged with 1710 grams of deionized water and 90 grams of methyl acrylate, and the latter was dissolved in the water. With the internal temperature of the reactor held at 30° C. the atmosphere within the reactor was replaced with nitrogen gas, followed by the addition of 0.063 gram of sodium chlorate, 0.597 gram of sodium sulfite (molar ratio: $NaClO_3/Na_2SO_3=1/8$) and 0.334 gram of nitric acid. The polymerization reaction was conducted with constant stirring for 15 minutes, at the end of which time 258 grams of the polymer slurry was withdrawn. 250 cc. nitric oxide was blown each minute into the slurry withdrawn as above for a total of 5 minutes and the inhibitory effect of nitric oxide on the polymerization reaction was studied. The polymer slurry into which nitric oxide had been blown as above was left standing at 30° C. and its changes in the degree of polymerization with the passage of time were studied and compared with another sample into which no inhibitor had been introduced. The results are summarized in Table 15. It will be apparent that addition of nitric oxide completely inhibits the reaction.

TABLE 15

| Polymerization time (min.) | Degree of polymerization when no inhibitor is added (percent) | Degree of polymerization after nitric oxide is added (percent) |
|---|---|---|
| 5 | 2.8 | |
| 10 | 9.2 | |
| 15 | 17.9 | (*) |
| 30 | | 17.9 |
| 51 | 65.3 | |
| 60 | 65.0 | 17.8 |
| 93 | 67.4 | |
| 120 | 69.0 | 17.9 |

*NO added after 15 minutes.

EXAMPLE 7

A reactor equipped with agitator means was charged with 1400 grams of deionized water, 90 grams of acrylonitrile, and 10 grams of methyl acrylate and the monomers were completely dissolved in the water. With the internal temperature of the reactor held at 45° C., the atmosphere within the reactor was replaced with nitrogen gas, followed by the addition of 3.0 grams of potassium persulfate, 14.0 grams of sodium sulfite (molar ratio:

$$K_2S_2O_8/Na_2SO_3=1/10$$

and 7.0 parts of nitric acid. The monomers were polymerized with constant stirring. As the polymerization reaction was initiated as above, the reaction mixture began to show a white turbidity. This moment was assumed to be the starting point of the reaction. Thus, after 10 minutes, 318 grams of the polymer slurry was withdrawn from the reactor and 250 cc. of nitric oxide was blown each minute into the slurry withdrawn as above for a total of 10 minutes to study the inhibitory effect of nitric oxide on the polymerization reaction. The polymer slurry into which nitric oxide had been blown as above was left standing at 45° C. and its changes in the degree of polymerization with the passage of time were measured and compared with the remainder of the polymer slurry which received no inhibitor. The results are summarized in Table 16. It will be apparent that the addition of nitric oxide completely inhibits the polymerization reaction.

TABLE 16

| Polymerization time (min.) | Degree of polymerization when no inhibitor is added (percent) | Degree of polymerization after nitrogen oxide is added (percent) |
|---|---|---|
| 2 | 6.8 | |
| 5 | 15.3 | |
| 10 | 26.8 | (*) |
| 20 | 48.2 | 26.8 |
| 65 | 76.0 | 27.0 |
| 120 | 86.6 | 26.9 |

*NO added after 10 minutes.

EXAMPLE 8

A reactor equipped with an agitator was held at a constant temperature of 45° by jacket means, and was continuously charged with suitable amounts of monomers, polymerization initiators, nitric acid and water in such a manner that the reaction mixture remained in the reactor for an average of 70 minutes, with the reaction product being continuously withdrawn from the reactor. In this fashion, a copolymer of acrylonitrile, methyl acrylate, and sodium methallylsulfonate was continuously polymerized. The monomeric mixture was composed of 90 parts of acrylonitrile, 10 parts of methyl acrylate, and 0.76 part of sodium methallylsulfonate, and the total amount of the monomers was 29% of the total amount of liquids charged into the reactor. Based on 100 parts of the monomers, 0.275 part of sodium chlorate, 200 parts of sodium sulfite, and 1.17 parts of nitric acid were added. The concentration of the copolymer in the slurry withdrawn from the reactor was 22.4%. The slurry was filtered, and the inhibitory effect of nitric oxide on the polymerization reaction studied with respect to the filtrate which contained the unreacted monomers. Thus, 10 cc. of a saturated aqueous solution of nitric oxide, which had been prepared by blowing nitric oxide gas into water, was added to 10 cc. of the above filtrate containing the unreacted monomers, and the mixture was left standing at room temperature for 24 hours, at the end of which time there was no signs of white turbidity and, hence, no further polymerization.

On the other hand, when the same amount of deionized water instead of the aqueous solution of nitric oxide, was added to a similar slurry and the mixture was left standing in the same manner as above, the filtrate began to show signs of white turbidity after 7 minutes of standing, indicating that polymer was being formed. When, without the addition of water, the filtrate was left standing at room temperature, it began to exhibit white turbidity in 1.5 minues, with polymer being formed rapidly. It will be apparent from the above description that the polymerization of the unreacted monomers can be completely inhibited by adding an aqueous solution of nitric oxide to an aqueous solution containing the unreacted monomers.

We claim:

1. In the polymerization of monomers containing ethylenically unsaturated groups which are polymerizable in the presence of a redox polymerization initiator system containing a reducing sulfoxy compound as one of its components to produce an aqueous slurry, the improvement which comprises substantially stopping further polymerization of such monomers by adding to such slurry, in an amount sufficient to substantially stop further polymerization, a compound selected from the group consisting of water-soluble nitrites and nitric oxide.

2. A process as defined in claim 1 wherein sufficient water-soluble nitrite is added to substantially stop said polymerization reaction.

3. A process as defined in claim 1 wheerin sufficient nitric oxide is added to substantially stop said polymerization reaction.

4. A process for inhibiting polymerization of aqueous solutions of monomers containing ethylenically unsaturated groups which are polymerizable when in the presence of a redox polymerization initiator system containing a reducing sulfoxy compound as one of its components, said aqueous solutions containing such redox polymerization initiator systems; said process comprising adding to such solutions, in an amount sufficient to inhibit polymerization, a compound selected from the group consisting of water-soluble nitrites and nitric oxide.

5. A process as defined in claim 4 wherein sufficient water-soluble nitrite is added to inhibit polymerization of said monomers.

6. A process as defined in claim 4 wherein sufficient nitric oxide is added to inhibit polymerization of said monomers.

References Cited

UNITED STATES PATENTS

| | | | |
|---|---|---|---|
| 2,741,583 | 4/1956 | Vaughan | 260—48.6 |
| 2,491,444 | 12/1944 | Cox et al. | 260—45.9 |
| 2,878,206 | 3/1959 | Holmes et al. | 260—45.9 |
| 3,065,193 | 11/1962 | Volk | 260—45.9 |
| 3,127,384 | 3/1964 | Sparks et al. | 260—45.9 |

DONALD E. CJAJA, *Primary Examiner.*

H. E. TAYLOR, *Assistant Examiner.*

U.S. Cl. X.R.

260—86.1, 88.3, 88.7, 89.5, 89.7, 91.1, 91.3, 92.8, 93.5, 290, 460, 461, 465.9, 486, 593, 611.5